Oct. 28, 1958     J. G. SOLA     2,858,479
ALTERNATING CURRENT POWER SUPPLY APPARATUS
Filed May 21, 1956
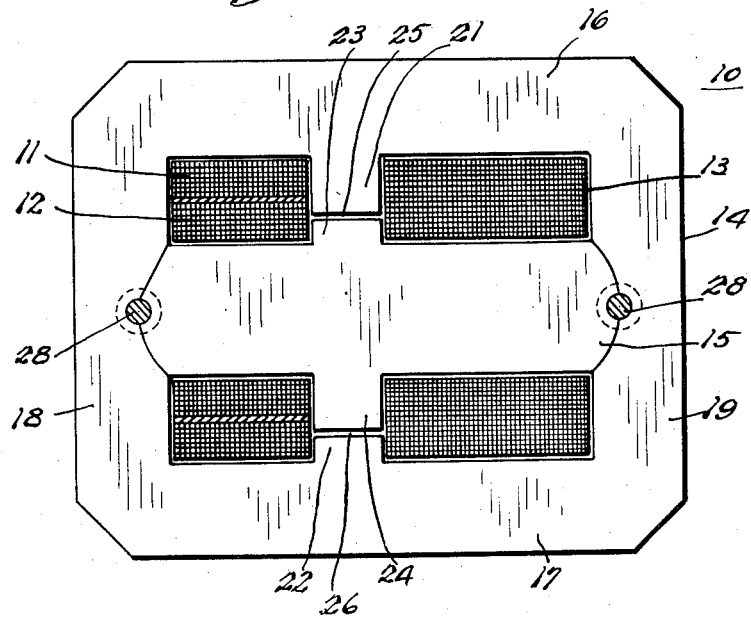
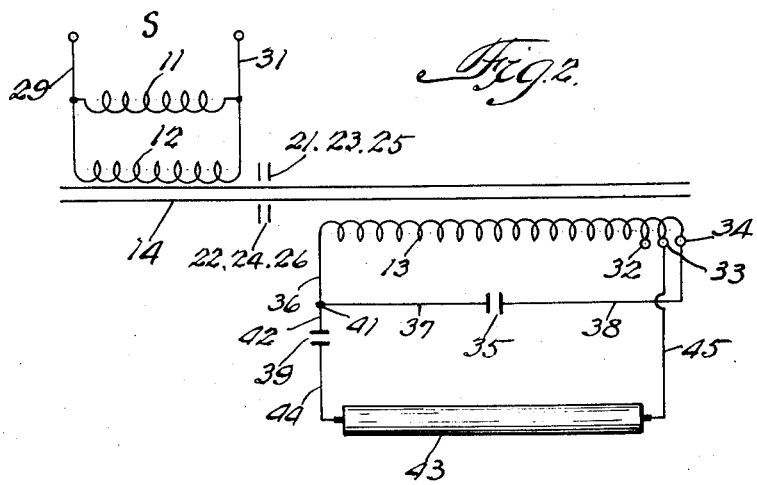
INVENTOR.
Joseph G. Sola

United States Patent Office 2,858,479
Patented Oct. 28, 1958

2,858,479

ALTERNATING CURRENT POWER SUPPLY APPARATUS

Joseph G. Sola, River Forest, Ill., assignor, by mesne assignments, to Basic Products Corporation, West Milwaukee, Wis., a corporation of Wisconsin Application May 21, 1956, Serial No. 586,131

4 Claims. (Cl. 315—100)

This invention relates to alternating current power supply apparatus to be connected between a source of voltage and a negative resistance discharge device for starting and operating thereof, and it is an object of the invention to provide improved apparatus of this character, the invention being an improvement upon the subject matter disclosed and claimed in the Patent No. 2,346,621 to Joseph G. Sola, dated April 11, 1944, and entitled "Alternating Current Supply System."

It is well known that negative resistance discharge devices, such, for example, as mercury vapor lamps have the property of requiring a high voltage for starting and a considerably lower voltage for operating, with some form of ballast being necessary to provide current limitation, and it is a further object of the invention to provide, in apparatus for starting and operating such devices, an improved means for starting whereby the resulting structure is simple in form, small in size and economical to manufacture.

It is a further object of the invention to provide improved apparatus of the character indicated which eliminates the need for special starting windings and the like.

It is a further object of the invention to provide improved apparatus of the character indicated which is productive of substantial savings in iron and copper.

It is a further object of the invention to provide, in apparatus of the character indicated, an improved starting and operating arrangement whereby the wave shape of current in the negative resistance discharge device after starting is improved and the device may be maintained in operation in spite of fluctuations of the supply voltage substantially below a rated range of fluctuation.

In carrying out the invention in one form a transformer device is provided which in combination with one capacitor in a series circuit with the secondary winding of the transformer and with the negative resistance discharge device forms an operating circuit functioning at the fundamental frequency and which in combination with another capacitor across the secondary winding forms a starting and operation-maintenance circuit functioning at the third harmonic frequency. Through selection, according to the invention, of the transformer turns ratio a device is obtained which in combination with the two capacitors produces the advantageous results among which are optimum current through the discharge device, that is a current having desired root means square (R. M. S.) value and proper wave shape and maintenance of operation in spite of fluctuations of the supply voltage substantially below a rated range of fluctuation.

Further objects and advantages of the invention will appear as the description proceeds.

For a better understanding of the invention, reference should be had to the accompanying drawing, in which:

Figure 1 is a plan view partially in section of one form of transformer which may be utilized in carrying out the invention, and Fig. 2 is a circuit diagram showing electrical connections of the transformer shown in Fig. 1 together with certain other circuit components.

Referring to the drawing, a transformer 10 is shown including primary windings 11 and 12, secondary winding 13, and an iron core 14. The core 14 is shown as being of the shell type having a central leg 15 and an outer shell consisting of integrally formed side legs 16 and 17 and end legs 18 and 19. The core may be formed of laminations punched from suitable transformer sheet steel in the form of the outer shell comprising the legs 16, 17, 18 and 19 and punching therefrom, in substantially the same operation, the laminations forming central leg 15. A suitable number of laminations are assembled together to give a stack of desired thickness. The windings 11, 12 and 13, which may be form-wound, are disposed on the central leg 15 and the resulting assembly is pressed into the assembled stack of outer laminations.

Disposed between primary windings 11 and 12 and secondary winding 13, there are high reluctance shunts consisting of portions 21 and 22 formed integrally with side legs 16 and 17, respectively, and portions 23 and 24 formed integrally with central leg 15. The portions 21 and 23 are separated by a nonmagnetic gap, shown as an air gap 25, and the portions 22 and 24 likewise are separated by a nonmagnetic gap, which may be an air gap 26. The high reluctance shunts 21, 23, 25 and 22, 24, 26 provide a leakage flux path whereby portions of the fluxes of the primary and secondary windings may link the respective windings individually, to the exclusion of the respective other windings. In this manner, the core provides a high leakage reactance for each of the primary and secondary windings. Other well known constructions for obtaining the necessary high leakage reactance may be utilized, such, for example, as relatively thin and elongated windings placed side by side on a core.

With the shunt portions 23 and 24 formed directly on the central leg 15, a convenient arrangement is had for positioning the windings on the central leg prior to its assembly into the outer shell. To be certain that the laminations forming the central leg 15 are oriented correctly, the shunt portions 23 and 24 are of different lengths. The shunt portions 21 and 22, of course, are of appropriate length to cooperate respectively with shunt portions 23 and 24. Since the laminations forming central leg 15 are first punched from the outer shell laminations, and are assembled and then pressed into an assembly of outer shell laminations, the fit of the central leg 15 into the outer shell is tight and good magnetic contact is had at the junctures between the ends of the central leg 15 and the end legs 18 and 19. To hold the laminations together, rivets 28 or the like may be provided at each end of the central leg and may be so disposed as to hold the central leg to the outer shell.

For further description of the structure of the invention and for an understanding of the operation thereof, reference should be had to Fig. 2 which is a circuit diagram showing the connections for the various components. In this figure, the reference characters are the same as those used in Fig. 1 to designate corresponding parts. The core 14 and the high reluctance shunts 21, 23, 25 and 22, 24, 26 are shown schematically and the primary windings 11 and 12 and the secondary winding 13 are shown disposed on different sides of the shunts. The primary windings 11 and 12 are shown connected in parallel and are connectible by means of conductors 29 and 31 to a source S of alternating current having a predetermined nominal voltage and frequency such, for example, as 115 volts at 60 cycles.

If desired, the primary windings 11 and 12 may be connected in series in order that a source S of double voltage, for example, 230 volts, may be used while still developing the same voltage at the secondary winding for supplying the load. The secondary winding 13 is provided with a series of taps 32, 33 and 34 adjacent one end thereof. A capacitor 35 is shown connected to conductor 36 at one end of the secondary winding 13 and to the tap 34 at the other end by means respectively, of conductors 37 and 38. A capacitor 39 is connected to the junction 41 of conductors 36 and 37 by means of conductor 42 and to one terminal of a negative resistance discharge device 43 by means of conductor 44. The other terminal of negative resistance discharge device 43 is connected by means of a conductor 45 to the tap 33.

As will be more fully explained, the combination of secondary winding 13 and capacitor 35 forms a starting arrangement for the negative resistance discharge device 43, and the combination of capacitor 39 and secondary winding 13 forms an operating arrangement for the negative resistance discharge device after starting thereof. The operating circuit, after starting of the negative resistance discharge device, including both capacitors 35 and 39 and the secondary winding 13, has certain advantages which will be more completely pointed out.

While the conductor 38 is shown connected to tap 34 and the conductor 45 is shown connected to tap 33, this is by way of example of one possible form of structure. Capacitor capacities vary within certain manufacturing tolerances and, consequently, different capacitors may produce different voltages when connected to the same winding. In order to arrive at the optimum desired voltages, the taps 32, 33, 34, and if desired, others, are provided in order that the taps which will give the desired voltages with particular capacitors in the circuit may be utilized.

The turns ratio of secondary winding 13 and either of primary windings 11 and 12, in the parallel combination shown, is of such a low value that the steady state voltage developed by winding 13 in the absence of capacitor 35 is normally insufficient to start the negative resistance discharge device 43. In one practical form of device, according to the invention, the voltage developed by secondary winding 13, when a 115 volt source was connected to the primary, was approximately 189 volts while the voltage necessary to strike the negative resistance discharge device (a mercury vapor lamp) was approximately 300 volts. The turns ratio voltage of 189 volts was substantially equal to the product of the ratio of turns and the primary voltage inasmuch as the high reluctance shunts 21, 23, 25 and 22, 24, 26 do not divert a substantial amount of flux prior to the flow of current in the secondary winding.

Both the capacitive reactance of capacitor 35 and the effective inductive reactance available at the terminals of the secondary winding 13 to which said capacitor is connected are related to each other so that at an odd harmonic frequency with respect to the frequency of the source S, preferably the third harmonic, a harmonic voltage substantially larger in magnitude than the turns ratio voltage is obtained at the said terminals. The magnitude of the harmonic voltage is made sufficient to start the negative resistance discharge device 43. Prior to the actual striking of the negative resistance discharge device there is no current therein and the external load circuit is virtually open circuited. In the practical form of device already referred to, the third harmonic voltage had a magnitude of substantially 314 volts across the capacitor 35 which had a capacity value of 5.0 microfarads.

The third harmonic voltage produced is a by-product of the magnetic saturation which exists in the portion of the core associated with the secondary winding 13. The capacitor 35 is preferably selected so that the primary current obtained, when only the said capacitor is connected to the winding 13, i. e., discharge device 43 is disconnected, is low in magnitude and may be substantially less than full-load primary current. High inrush currents and circuit breaker or fusing problems associated therewith are thereby avoided. The conditions observed in the circuit of capacitor 35 and winding 13 are due apparently to the fact that the circuit is nonlinear in its operating characteristics. Utilizing a harmonic voltage enables a much smaller capacitor to be used to bring about the desired voltage rise and at the same time enables the number of turns in the secondary winding to be reduced. The size of the device is thus enabled, according to the invention, to be made smaller and more efficient.

The relationship between capacitor 35 and the inductance to which it responds at the terminals of winding 13 is somewhat delicate in that slight variations of the capacity value (due, for example, to manufacturing tolerances) may cause substantial changes in voltage across capacitor 35 and also changes in the line current at starting. These effects are minimized, if not completely eliminated, by selecting the appropriate tap of winding 13 for connection to capacitor 35.

Prior to the actual striking of negative resistance discharge device 43, there is no voltage drop across capacitor 39 and substantially the full voltage developed by the harmonic starting circuit is applied across the negative resistance discharge device. Thereupon, it strikes and current begins to flow through it and the capacitor 39. The full voltage of the harmonic circuit may differ slightly from that applied to the negative resistance discharge device at starting in view of the fact that the conductor 45 may be connected to a different tap than conductor 38, but the number of turns between these taps is small.

After the negative resistance discharge device 43 has started and current is flowing therein, the harmonic voltage developed across the secondary winding 13 and the capacitor 35 decreases substantially, and the current through the capacitor 35 decreases to a small value. Accordingly, little energy is lost in the harmonic circuit after the negative resistance discharge device starts. In the practical form of device, the third harmonic voltage of 314 volts across capacitor 35 prior to striking of the negative resistance discharge device 43 drops to a negligible value after striking thereof and a substantially 60 cycle or fundamental frequency voltage having a magnitude of 254 volts appears.

The capacitive reactance of capacitor 39 is so related to the effective inductive reactance available at the terminals of the secondary winding to which said capacitor 39 and discharge device 43 are connected, both at the fundamental frequency of said source S that an operating condition throughout the complete device having certain definite advantages is established as will become clear. The secondary winding 13, the primary winding 11—12, the capacitor 39, the negative resistance discharge device 43, and the capacitor 35 contribute their part to the said operating condition at the fundamental frequency to bring about the advantages according to the invention. Thus the current through the negative resistance discharge device 43 and the voltage thereacross are maintained at optimum values, i. e., desired R. M. S. values and proper peak to R. M. S. ratio or wave shape, whereby the light output of the device is maintained substantially constant in spite of fluctuations in voltage of the source S over a rated range, that is, for example, from 100 to 130 volts for a device having a nominal primary voltage rating of 115 volts. Moreover, high power factor, ninety per cent or better is obtained at the input terminals 29 and 31 along with reduced size of the device and high efficiency of operation and line current at starting is maintained below the operating current. The optimum conditions described are obtained even though the voltage across the winding 13 is at a substantially higher value than the turns ratio voltage after the negative resistance discharge device is operating. The increased voltage across the secondary winding is associated with the stable operating condition of the negative resistance discharge device and is believed due to the saturated magnetic flux condition of the core and the phenomenon of ferro-resonance. In the practical form of device, the capacitor 39 had a value of 39.0 microfarads, the voltage across conductors 36 and 45 was substantially 254 volts as compared with 189 volts according to the turns ratio, the voltage across capacitor 39 was 205 volts and the voltage across the discharge device 43 was 135 volts.

It has been found that satisfactory operation of the negative resistance discharge device 43 may be obtained with a variety of amplitudes of the third harmonic starting voltage. However, the ratio of peak current to R. M. S. current through the negative resistance discharge device is higher for turns ratios giving higher values of the third harmonic starting voltage and is lower for lower turns ratios. Thus, while the third harmonic starting voltage is advantageous, in that a starting voltage is developed without the need for external starters, special windings, etc., the utilization of a winding 13 of more turns than are needed, in combination with an appropriate capacitor 35, to develop the required starting voltage results in a bulkier device and one having a higher value of the ratio of peak current to R. M. S. current, with resultant decreased life of the negative resistance discharge device. Accordingly, in order to produce an improved device characterized by small size and economy of manufacture and also having a desirable value of the ratio of peak current to R. M. S. current, for example, a ratio of 1.56, the present invention utilizes a secondary winding 13 having a minimum number of turns to give the necessary third harmonic starting voltage. The third harmonic voltage developed should be sufficient at the lower end of the rated range of variation of the source voltage, for example, 100 volts, to start the negative resistance discharge device.

The fundamental frequency operating circuit will maintain the negative resistance discharge device operating with optimum light output even though the voltage of the source drops to the lower limit of the rated range of variation. This may occur even if the capacitor 35 of the third harmonic starting circuit is removed. However, at still lower values of the source voltage there is a likelihood that the negative resistance discharge device will be extinguished in the absence of the capacitor 35. The presence of the capacitor 35 not only provides the third harmonic starting voltage but provides, in combination with the capacitor 39 and the winding 13, a voltage condition such that when the voltage of the source drops below the lowest point of the rated range of variation by a substantial amount, the discharge device 43 will remain in satisfactory operation. Apparently, under this latter condition, if the discharge device has a tendency to be extinguished, the third harmonic high starting voltage tends to be reestablished, with the result that the discharge device continues to function.

Throughout this specification, all references to a practical form of device are by way of example only and are to the same device, which was rated at 400 watts, and in which each of the primary windings 11 and 12 had 168 turns, the secondary winding 13 had 275 turns, the cross-sectional area of the central leg 15 was approximately 2.8 square inches and the cross-sectional area of each of the side legs 16 and 17 and the end legs 18 and 19 was approximately 1.97 square inches. The laminations making up the core were made of 24 gauge cold reduced steel designated as type M-22 electrical steel by the manufacturers thereof and the flux densities in the primary and secondary portions of central leg 15, utilizing a stacking factor of .9, were approximately 100,000 lines per square inch and 136,700 lines per square inch respectively. This device when operated at a primary voltage of 115 volts produced an input power factor of approximately 100 percent, The total cross-sectional area of the outer shell is substantially greater than that of the inner leg, whereby stray fields surrounding the core are substantially eliminated while the condition in the nature of series resonance exists.

While a particular embodiment of the invention has been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. Alternating current power supply means for starting and operating negative resistance discharge devices comprising a transformer having a magnetic core, a primary winding on said core and adapted for connection to a current source of predetermined nominal voltage and frequency, a secondary winding on said core and adapted to be connected in circuit with a negative resistance discharge device of predetermined starting and operating voltages, and a high reluctance magnetic shunt magnetically disposed between said primary and secondary windings, means comprising a first capacitor and said secondary winding connected to each other and being adapted to be connected to such negative resistance discharge device in an effective series circuit for maintaining during operation substantially optimum values of voltage to and current in such device when connected in said series circuit throughout a rated range of voltage variation of said current source, the ratio of turns of said secondary winding to said primary winding being such that the transformation voltage of said secondary winding at the nominal voltage and frequency of said primary winding is normally insufficient to start such device when connected in said series circuit and is sufficiently low to effect a predetermined low value in the ratio of peak current to R. M. S. current in such device during operation thereof, and means comprising a second capacitor connected across said secondary winding for developing in combination with said secondary winding a voltage at odd harmonics including principally the third harmonic of said source frequency sufficient to start such device when connected in said series circuit but which after starting diminishes to a voltage substantially less than said developed starting voltage and of substantially fundamental frequency.

2. Alternating current power supply means for starting and operating negative resistance discharge devices comprising a transformer having a magnetic core, a primary winding on said core and adapted for connection to a current source of predetermined nominal voltage and frequency, a secondary winding on said core and adapted to be connected in circuit with a negative resistance discharge device of predetermined starting and operating voltages, and a high reluctance magnetic shunt magnetically disposed between said primary and secondary windings, means comprising a first capacitor and said secondary winding connected to each other and being adapted to be connected to such negative resistance discharge device in an effective series circuit for maintaining during operation substantially optimum values of voltage to and current in such device when connected in said series circuit throughout a rated range of voltage variation of said current source, the ratio of turns of said secondary winding to said primary winding being such that the transformation voltage of said secondary winding at the nominal voltage and frequency of said primary winding is normally insufficient to start such device when connected in said series circuit and is sufficiently low to effect a predetermined low value in the ratio of peak current to R. M. S. current in such device during operation thereof, and means comprising a second capacitor connected across said secondary winding for developing in combination with said secondary winding a voltage at the odd harmonics including principally the third harmonic of said source frequency sufficient to start such device when connected in said series circuit but which after starting diminishes to a voltage substantially less than said developed starting voltage and of substantially fundamental frequency, the constants of said second capacitor, said secondary winding and other components of the circuit including the negative resistance discharge device being so proportioned relative to each other and with respect to said third harmonic frequency that sufficient voltage is maintained during operation of such device, with consequent continuation thereof, when the voltage of said current source decreases to a value substantially less than the lower limit of said rated range of variation.

3. Alternating current power supply means for starting and operating negative resistance discharge devices comprising a transformer having a magnetic core, a primary winding on said core and adapted for connection to a current source of predetermined nominal voltage and frequency, a secondary winding on said core and adapted to be connected in circuit with a negative resistance discharge device of predetermined starting and operating voltages, and a high reluctance magnetic shunt magnetically disposed between said primary and secondary windings, means comprising a first capacitor and said secondary winding connected to each other and being adapted to be connected to such negative resistance discharge device is an effective series circuit for maintaining during operation substantially optimum values of voltage to and current in such device when connected in said series circuit throughout a rated range of voltage variation of said current source, the ratio of turns of said secondary winding to said primary winding being such that the transformation voltage of said secondary winding at the nominal voltage and frequency of said primary winding is normally insufficient to start such device when connected in said series circuit, and means comprising a second capacitor connected across said secondary winding for developing in combination with said secondary winding a voltage at odd harmonics including principally the third harmonic of said source frequency sufficient to start such device but which after starting diminishes to a voltage substantially less than said developed starting voltage and of substantially fundametnal frequency, the constants of said second capacitor, said secondary winding and other components of the circuit including the negative resistance discharge device being so proportioned relative to each other and with respect to said third harmonic frequency that sufficient voltage is maintained during operation of such device when connected in said series circuit, with consequent continuation thereof, when the voltage of said current source decreases to a value substantially less than the lower limit of said rated range of variation.

4. Alternating current power supply means for starting and operating negative resistance discharge devices comprising a transformer having a magnetic core, a primary winding on said core and adapted for connection to a current source of predetermined nominal voltage and frequency and a secondary winding on said core and adapted to be connected in circuit with a negative resistance discharge device of predetermined starting and operating voltages, said magnetic core providing a high magnetic leakage path for a portion of the flux to thread through one of the windings to the exclusion of the other winding, means comprising a first capacitor and said secondary winding connected to each other and being adapted to be connected to such negative resistance discharge device in an effective series circuit for maintaining during operation substantially optimum values of voltage to and current in such device when connected in said series circuit throughout a rated range of voltage variation of said current source, the ratio of turns of said secondary winding to said primary winding being such that the transformation voltage of said secondary winding at the nominal voltage and frequency of said primary winding is normally insufficient to start such device when connected in said series circuit and is such as to effect a predetermined desired value in the ratio of peak current to R. M. S. current in such device during operation thereof, and means comprising a second capacitor connected across said secondary winding for developing in combination with said secondary winding a voltage at odd harmonics including principally the third harmonic of said source frequency sufficient to start such device when connected in said series circuit but which after starting diminishes to a voltage substantially less than said developed starting voltage and of substantially fundamental frequency, the constants of said second capacitor, said secondary winding and other components of the circuit including the negative resistance discharge device being so proportioned relative to each other and with respect to said third harmonic frequency that sufficient voltage is maintained during operation of such device when connected in said series circuit, with consequent continuation thereof, when the voltage of said current source decreases to a value substantially less than the lower limit of said rated range of variation.

References Cited in the file of this patent

UNITED STATES PATENTS

| | | |
|---|---|---|
| 2,404,254 | Short | July 16, 1946 |
| 2,470,460 | Bird | May 17, 1949 |
| 2,487,092 | Bird | Nov. 8, 1949 |

FOREIGN PATENTS

| | | |
|---|---|---|
| 722,823 | Great Britain | Feb. 2, 1955 |